UNITED STATES PATENT OFFICE.

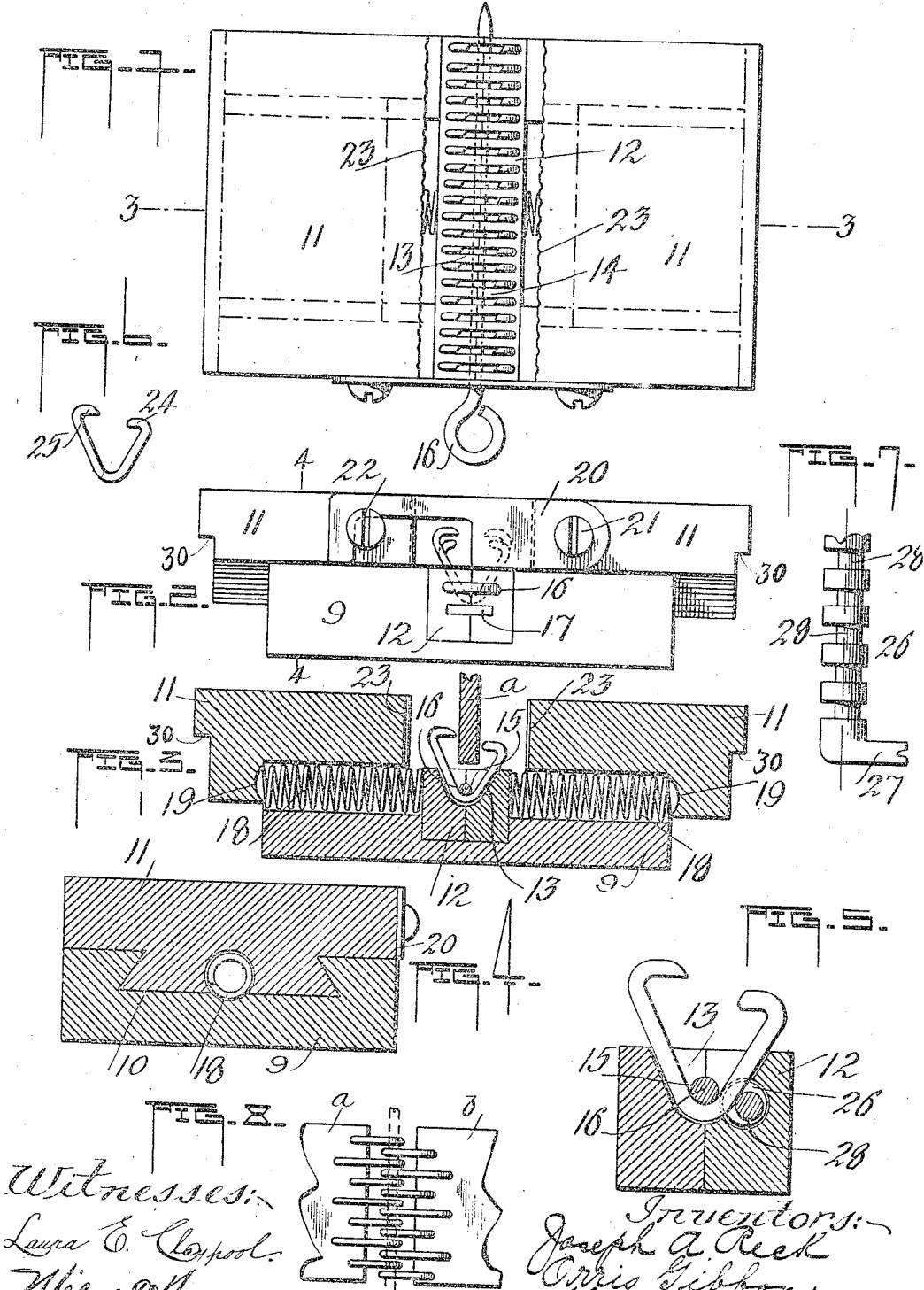

JOSEPH A. RECK, OF ADRIAN, AND ORRIS GIBBON, OF HILLSDALE, MICHIGAN, ASSIGNORS, BY MESNE ASSIGNMENTS, TO MALCOLM W. EDGAR, OF DETROIT, MICHIGAN.

BELT-LACING MACHINE.

993,548.  Specification of Letters Patent. Patented May 30, 1911.

Application filed August 5, 1909. Serial No. 511,412.

*To all whom it may concern:*

Be it known that we, JOSEPH A. RECK, a citizen of the United States, residing at Adrian, in the county of Lenawee and State of Michigan, and ORRIS GIBBON, a citizen of the United States, residing at Hillsdale, in the county of Hillsdale and State of Michigan, have invented certain new and useful Improvements in Belt-Lacing Machines; and we do hereby declare that the following is a full, clear, and exact description of the invention, which will enable others skilled in the art to which it appertains to make and use the same.

This invention has reference to belt-lacing machines.

One of the objects of the present invention is to provide a portable machine adapted to receive and contain the hooks to be attached to the ends of the belt, in combination with movable die-members which may be operated by any suitable actuating or power devices for forcing said die-members together and thereby connecting the hooks to the belt.

A further object of the present invention is to provide a belt-lacing machine with a hook retainer for holding the hooks suitably spaced apart, in combination with oppositely movable die-members yieldingly held spaced apart and in normal position, the matching faces of which are formed with a plurality of spaced grooves in alinement with the hooks, whereby when the die members are forced together, the grooves in their acting faces will form a seat for the engaging portion of the die-members with the hooks and hold the hooks in perfect working position during the forcing of the pointed ends of said hooks into the belt.

The invention has for its further object to provide a belt-lacing machine wherein the hooks are forced into the belt by means of movable die-members operated by any suitable power, and wherein is provided an eccentric member adapted to engage and hold different sizes of hooks in proper receiving position for the belt to which they are to be attached, whereby the machine is made capable of receiving and operating upon various sizes of hooks.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a plan view of our belt-lacing machine; Fig. 2 is a side elevation of the machine; Fig. 3 is a longitudinal sectional view on the line 3—3 of Fig. 1; Fig. 4 is a cross-section on the line 4—4 of Fig. 2; Fig. 5 is an enlarged cross-section of the hook retainer, showing the eccentric member engaging a hook; Fig. 6 is a view showing one of the hooks; Fig. 7 is a plan of a portion of the eccentric member, and Fig. 8 is a plan of a portion of two ends of a belt showing how they are laced after the hooks are attached to the ends of the belt.

Like numerals of reference indicate corresponding parts throughout the figures.

In the drawings, 9 denotes a base plate for supporting the operative parts of the device and said base plate is channeled out as at 10 forming a dove-tail groove in which are slidably mounted the oppositely movable die-members 11. Extending transversely of and at a point preferably central of said base plate, a hook receiving member 12 is embedded in said base plate, with the upper face of said member 12, preferably flush with the upper face of said plate, on which the die-members 11 are slidably mounted.

The hook receiving member 12 is provided with a plurality of spaced, preferably V shaped, or approximately V shaped, hook receiving sockets 13 which are separated from each other by the intervening walls 14 of any suitable thickness. Each wall 14 and the end walls of said member 12 are provided with an opening 15, which openings are located at a suitable point above the base of the sockets 13, and in axial alinement with each other, whereby when a hook has been placed in each socket, a pin or similar member 16 may be projected across the member 12, through the openings 15 and above that portion of the hooks in the base of the sockets, for locking the hooks in the receiving member 12, preparatory to receiving the end of the belt between the pointed ends of the hooks. The receiving member 12 is preferably made in half sections, as shown, and the parts united by the pin 17, see Fig. 2.

The die-members 11 are yieldingly held spaced apart by coil springs 18. The inner ends of the springs bearing against the hook receiving member 12 and their outer ends bearing against shoulders 19 formed on the die-members 11. A hooked lever 20 pivoted at 21 to one member 11 and adapted to engage a stud 22 on the opposite member 11 governs the distance of separation of said members under the action of the springs 18, and locks the parts against accidental displacement or from becoming separated; although by releasing the lever 20 from the stud 22, the members 11 may be removed from the base plate 9.

The acting or matching faces of the die-members 12 are each provided with a plurality of spaced grooves 23. These grooves are in alinement with the sockets 13 in the member 12, so that when the members are moved toward each other, the opposite ends and sides of the hooks will be seated in the grooves 23 and held in perfect working position during the operation of forcing the pointed ends of the hooks into and through the belt to which they are to be attached. In this way there is no chance for the pointed ends of the hooks canting sidewise when entering the belt, and thus there is insured a perfect lace when the ends of the belt are brought together, as seen in Fig. 8.

We prefer to use hooks like those shown in the figures, particularly Fig. 6, where a V shaped, or approximately V shaped hook is shown, having diverging sides, one of which is shorter than the other and having their ends turned inwardly, as at 24 and 25 and projected toward each other. These hooks are intended to be made in various sizes and thicknesses, according to the heft of belting to which they are to be attached, and it is provided that the one machine may be used to receive them all. That is to say, the sockets 13 in the member 12 will receive the largest as well as the smallest. In this case, means is provided for engaging the hooks to adjust them in position so that their hooked ends will fall into alinement, so that a belt may be passed down between the same, as shown in Fig. 3. For this purpose we provide the rotatable rod 26, see Figs. 5 and 7, extending through and journaled in the member 12 and having the crank 27 for turning the same. Where the rod coincides with a socket 13 it is formed with an eccentric engaging portion 28. Thus when different sizes of hooks are placed in the member 12, the rod 26 may be operated to engage the hooks to adjust them in the manner stated.

In operation, an operator will place as many hooks in the member 12 as will be required to extend across the belt to be laced, it being understood that the machine may be made of a size to receive all sizes of belts, or of different sizes. After the hooks are in position, they are locked by inserting the rod 16 through the openings 15, in manner previously explained. This done, the operator will place the machine in a vise or other power device, whereby the die-members 11 may be forcibly brought together. In the operation of bringing the members 11 together, the springs 18 will be compressed, and the grooves 23 of the die-members will receive the hooks and hold them in working position during the operation of forcing them through the belt, which has been previously passed down and between the hooked ends 24 and 25 of said hooks. When this has been accomplished, the members 11 are released, allowing the springs 18 to expand, moving the members 11 to their separated position, when the pin 16 may be removed, and the belt removed with the hooks attached. This operation may be referred to as the first operation, or the operation of attaching the hooks to the end $a$ of the belt. The machine is again supplied with hooks, when it may again be operated to attach hooks to the end $b$, being the opposite end of the belt. The hooks are preferably placed in the member 12, so that the hooked ends 24 and 25 of each adjacent hook will be alternately disposed. This will cause the ends of each hook to overlap when entering the belting and will place the ends of adjacent hooks into the belting in a manner similar to that seen in Fig. 8, or so that the belting will not be weakened, which might be the case, if all the hooked ends were in alinement across the belting. After the hooks are attached, the ends of the belt may be laced, as shown in Fig. 8, and a piece of rawhide or other attaching means may be passed through the hooks for retaining them in laced relation.

It is obvious that the lacing means shown may be used for lacing the opposite ends of a belt, and is also useful for lacing the matching ends of a belt, where it may be desirable to do so.

In the construction herein shown, the movable die-members 11 extend beyond the sides of the base and are provided with shoulders 30, so that the tool may be put between the open jaws of an ordinary vise, these shoulders resting upon the two jaws of the vise, and, as the vise is closed, the two die-members will be caused to approach and collapse the hooks.

Having thus fully described our invention, what we claim and desire to secure by Letters Patent of the United States, is:—

1. In a device of the class described, in combination, a base-plate, means for holding a plurality of belt-lacing-hooks on said plate, movable die-members mounted on said plate and formed with hook-receiving-grooves, yielding means for normally holding said die-members in spaced relation, and locking means for connecting said die-members.

2. In a device of the class described, in combination, a base-plate, means for holding a plurality of belt-lacing-hooks on said plate, movable-die-members mounted on said plate and formed with hook-receiving-grooves, guiding means for maintaining a proper relation between the die-members and said base-plate, yielding means for normally holding said die-members in spaced relation, and locking means for connecting the die-members.

3. In a device of the class described, the combination of a stationary base-plate, means for holding the belt-lacing hooks on said plate, and movable die-members slidingly engaging the stationary plate upon opposite sides of the hook-holder and projecting laterally beyond the base-plate, substantially as described.

4. In a device of the class described, the combination of a stationary base-plate, means centrally in the upper face thereof for holding a plurality of belt-lacing hooks, movable die-members sliding engaging with said base-plate on opposite sides of the hook-holder, said die-members extending laterally beyond the sides of the base-plate, and supporting shoulders on the die-members for supporting the entire device from the die-members.

5. The combination of a base, a hook-receiving block arranged transversely to the base and having a vertically open V-shaped recess in its face, die members slidingly engaging with the base and adapted to be moved across the outer edges of the recess, for the purpose specified.

6. The combination of a base, a hook-receiving block arranged transversely to the base and having a series of separated open V-shaped recesses in its face, in which the apex of V-shaped clips are adapted to be engaged, there being an aperture through the walls between the recesses near the bottom thereof, a pin adapted to be engaged therethrough, and die members slidingly engaging with the base on opposite sides of the recesses and adapted to be moved partially across the edges thereof inwardly from opposite sides.

7. The combination of a base, a hook-receiving recessed block centrally of the base and dies slidingly engaged with the base on opposite sides of the block and projecting laterally beyond the outer edges thereof, the inner faces of the die members adapted to be moved partially across the opposite edges of the recesses.

8. The combination of a base having centrally thereof a V-shaped recess adapted to receive the apex of V-shaped clips, die members slidingly engaging the base on opposite sides of the recess and adapted to be moved inwardly over the outer edges thereof.

9. The combination of a base having centrally thereof a V-shaped recess adapted to receive the apex of V-shaped clips, die members slidingly engaging the base on opposite sides of the recess, adapted to be moved inwardly over the outer edges thereof, and actuating portions of the dies extending laterally beyond the edges of the base.

10. The combination of a base having a central V-shaped recess, die members sliding on the base on opposite sides thereof, adapted to be separated beyond the edges of the recess or to be moved inward across the edges thereof from opposite sides, the dies projecting beyond the edges of the base, and shoulders on the dies beyond the base, adapted to rest upon actuating jaws.

In testimony whereof we affix our signatures, in presence of two witnesses.

JOSEPH A. RECK.
ORRIS GIBBON.

Witnesses:
 JOSEPH P. LIBS,
 H. I. C. HART.